United States Patent
Tsutsui (10) Patent No.: US 6,510,245 B1
(45) Date of Patent: Jan. 21, 2003

(54) METHOD OF GENERATING CLASSIFICATION MODEL AND RECORDING MEDIUM

(75) Inventor: Hiroaki Tsutsui, Tokyo (JP)

(73) Assignee: Yamatake Corporation (JP)

( * ) Notice: Subject to any disclaimer, the term of this patent is extended or adjusted under 35 U.S.C. 154(b) by 0 days.

(21) Appl. No.: 09/355,119

(22) PCT Filed: Nov. 19, 1997

(86) PCT No.: PCT/JP97/04215
§ 371 (c)(1),
(2), (4) Date: Jul. 19, 1999

(87) PCT Pub. No.: WO99/26164
PCT Pub. Date: May 27, 1999

(51) Int. Cl.$^7$ .................................................. G06K 9/62
(52) U.S. Cl. ....................................................... 382/228
(58) Field of Search ................................ 382/224, 225, 382/228, 257, 155, 160; 706/20; 704/245; 707/6, 7

(56) References Cited

U.S. PATENT DOCUMENTS

| | | | |
|---|---|---|---|
| 5,012,675 A | * | 5/1991 | Koller et al. ............... 73/432.1 |
| 5,309,228 A | * | 5/1994 | Nakamura .................. 358/500 |
| 5,422,984 A | * | 6/1995 | Iokibe et al. ................ 395/51 |
| 6,195,659 B1 | * | 2/2001 | Hyatt ............................ 707/7 |

FOREIGN PATENT DOCUMENTS

| | | | | |
|---|---|---|---|---|
| JP | 6-195520 A | | 7/1994 | ............ G06K/9/68 |
| WO | WO-97/41533 A1 | * | 11/1997 | ............ G06T/5/00 |

OTHER PUBLICATIONS

"Pattern Recognition By Self–Organizing Neural Networks", by Gail A. Carpenter et al., A Bradford Book, 1989.2.
"Neural Networks", by Simon Haykin, 1994, pp. 156–161.

* cited by examiner

Primary Examiner—Brian Werner
(74) Attorney, Agent, or Firm—Blakely Sokoloff Taylor & Zafman (57) ABSTRACT

When n-dimensional data which belongs to one class in an n-dimensional feature space defined by n types of variates and whose position is specified by the variates is input, the feature space is divided into $m^n$ divided areas by performing m-part division for each of the variates. In this division, a division number m is determined on the basis of a statistical significance level by regarding a degree of generation of a divided area containing one data as a degree following a probability distribution with respect to the division number m. A classification model is generated by classifying the generated divided areas depending on whether they contain n-dimensional data.

7 Claims, 11 Drawing Sheets

| E4 | E3 | E2 |
|----|----|----|
| E5 | E0 | E1 |
| E6 | E7 | E8 |

INTAKE-AIR TEMPERATURE

METHOD OF GENERATING CLASSIFICATION MODEL AND RECORDING MEDIUM

1. TECHNICAL FIELD

The present invention relates to a classification model generating method for pattern recognition or situation classification, which is used for recognition of, e.g., speech or image patterns or classification of situations, and a recording medium on which a program for making a computer execute the classification model generating method is recorded.

2. BACKGROUND ART

Systems used in the field of process control and the like are required to perform situation classification to discriminate whether the current situation is an abnormal situation or demands a predetermined operation. Situation classification for abnormality determination or operation decision can be regarded as a problem for classifying situations by classifying them into abnormal and normal situations or operations A and B in a feature space defined by feature amounts (to be referred to as variates hereinafter) used for situation classification.

As a conventional method of implementing situation classification, a discriminant analysis method is known. According to the discriminant analysis method, when there are classes characterized by a plurality of types of variates, a specific class to which the situation to be classified belongs is discriminated on the basis of data belonging to the respective classes. This method is generally based on statistical techniques.

Figure 21:
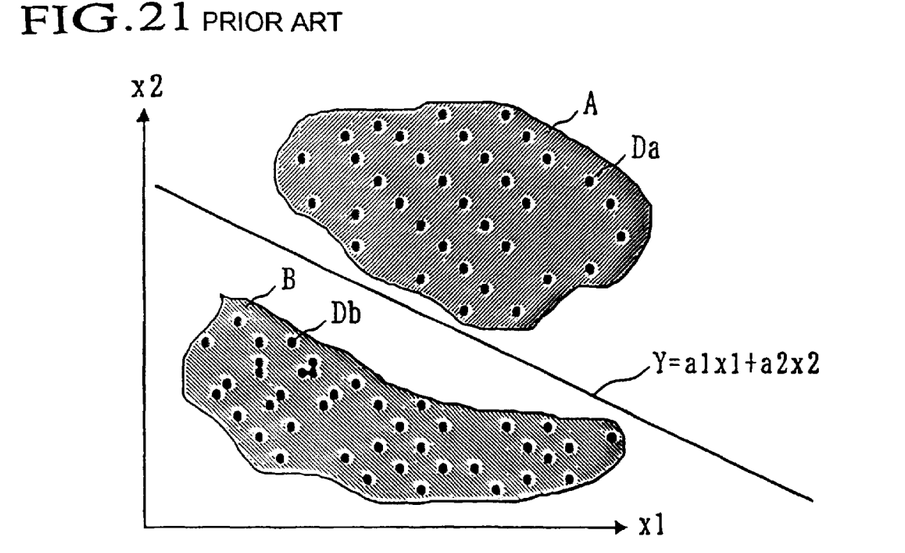
FIG. 21 is a view for explaining a conventional situation classification method using a discriminant analysis method.

Assume that a class that has achieved a given object is defined as class A, and a class that has not achieved the object is defined as class B, and that a plurality of data characterized by variates x1, x2, . . . , xn (e.g., the numbers of times of visits to customers, telephone charges, and the numerical values obtained by quantifying enthusiasm) have been obtained for the respective classes. In this case, the discriminant analysis method uses a discrimination function Y that assigns weights to the respective variates to clarify the difference between classes A and B.

$$Y = a1 \times 1 + a2 \times 2 + \ldots + an \times n \quad (1)$$

where a1, a2, . . . , an are the weights for the respective variates. Note that equation (1) is written, as an example of discrimination functions, for a case in which the discrimination function Y is linear (variance-covariance matrixes for the respective classes are equal). FIG. 21 shows how the discrimination function Y is determined when the space of class A as a set of data Da and the space of class B as a set of data Db are present in the two-dimensional feature space defined by the variates x1 and x2. With this function, when a situation in which $Y \geq 0$ occurs, it can be determined that the situation belongs to class A. If a situation in which $Y<0$ occurs, it can be determined that the situation belongs to class B.

Another method of implementing situation classification, a pattern recognition method of recognizing an object on the basis of a form, mode, or pattern which characterizes the object is known. As this pattern recognition method, a method using a neural network has been proposed (Gail A. Carpenter and Stephen Grossberg, "PATTERN RECOGNITION BY SELF-ORGANIZING NEURAL NETWORKS", A Bradford Book, 1991). As another pattern recognition method, a method using an RCE (Restricted Coulomb Energy) network has been proposed (D. L. Reilly, L. N. Cooper and C. Elbaum, "Self Organizing Pattern Class Separator and Identifier", U.S. Pat. No. 4,326,259. Awarded Apr. 20, 1982).

A neural network is an attempt to implement a parallel information processing mechanism based on neurons as in the brain of a creature in terms of engineering. When a neural network is to be used for situation classification, variates included in several typical situations and discrimination results to be output from the neural network in accordance with the variates must be supplied to the neural network to make it learn to obtain desired discrimination results. As a method of making the neural network learn, a back propagation method is generally used.

Figure 22:
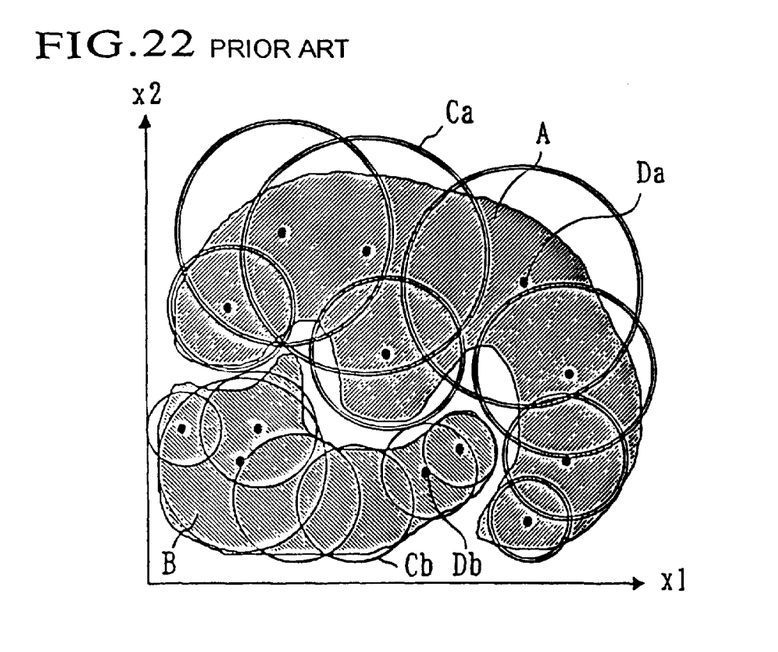
FIG. 22 is a view for explaining a conventional situation classification method using an RCE network.

An RCE network is used to classify a feature space by approximating classes occupying a linearly inseparable multi-dimensional space with a plurality of basic graphic patterns (e.g., multi-dimensional hyperspheres). In the case shown in FIG. 22, the spaces of linearly inseparable classes A and B are respectively approximated with basic graphic patterns Ca and Cb to classify the two-dimensional feature space defined by variates x1 and x2.

3. DISCLOSURE OF INVENTION

[Problem to be Solved by the Invention]

According to the discrimination analysis method, however, when the spaces of the respective classes cannot be linearly separated, a discrimination function must be approximated with a higher order polynomial. If, therefore, many types of variates are required, and the space of each class is complicated, a discrimination function is difficult to derive.

In the method using the neural network, the learning speed of the neural network is low (in general, about 100 to 1,000 learning processes are required; it takes about one week in some cases). In addition, it is difficult to determine an optimal network configuration for classification. Furthermore, since it takes much time to perform classification processing, i.e., classifying situations on the basis of variates characterizing the situations, an expensive semiconductor chip is required to increase the processing speed.

In the method using the RCE network, the basic graphic patterns Ca and Cb respectively centered on the data Da and Db belonging to classes A and B are generated to have sizes that do not interfere with the remaining classes. However, the data Da and Db serving as the centers of the basic graphic patterns do not always exist at positions where the spaces of classes A and B can be properly approximated. For this reason, a situation that should not be included in a given class may be determined as a situation belonging to the class. That is, a recognition error may occur. For example, in the case shown in FIG. 22, the basic graphic patterns Cb properly approximate the space of class B, whereas some basic graphic patterns Ca protrude from the space of class A. In this case, therefore, a situation that should not be included in class A may be determined as a situation belonging to class A. In addition, according to the method using the RCE network, when a few data are remote from the data groups of the respective classes, classification is affected by those data.

The present invention has been made to solve the above problems, and has as its object to provide a classification model generating method in which the learning speed and the classification processing speed are high, and the spaces of classes can be properly approximated even if the spaces of the respective classes cannot be linearly separated, and a recording medium on which a program for making a computer execute the classification model generating method is recorded.

[Means of Solution to the Problem]

As described in claim 1, according to the present invention, a classification model generating method of the present invention comprises the steps of, when n-dimensional data which belongs to one class in an n-dimensional feature space defined by n types of variates and whose position is specified by the variates is input, dividing the feature space into $m^n$ divided areas by performing m-part division for each of the variates, and determining a division number m on the basis of a statistical significance level in the division by regarding a degree of generation of a divided area containing one data as a degree following a probability distribution with respect to the division number m, setting a divided area containing n-dimensional data as a learning area belonging to the class, and associating each input data with a corresponding divided area, adding divided areas around the learning area as learning areas to expand a learning area group, and removing a learning area located on a boundary between the learning area and a divided area which is not a learning area from the learning area group to contract the learning area group.

As described above, in the present invention, the division number m is determined on the basis of a statistical significance level (data density) to divide a feature space, and the generated divided areas are classified depending on whether they contain n-dimensional data or not, thereby generating a classification model. With this operation, even if the spaces of the respective classes cannot be linearly separated, a classification model that properly approximates the space of each class can be generated. In addition, a divided area that should belong to a class can be added to a learning area group by performing the step of expanding the learning group and the step of contracting the learning area group.

As described in claim 2, the classification model generating method of the present invention further comprises determining the division number m based on the statistical significance level from an average and a variance for the division number m with which at least one divided area containing one data is generated.

As described in claim 3, the classification model generating method of the present invention further comprises removing a learning area having no learning area among adjacent areas from the learning area group before the learning area group is expanded.

As described above, an area containing data regarded as noise can be removed from learning areas by removing a learning area having no learning area among adjacent areas from a learning area group.

As described in claim 4, the step of expanding the learning area group comprises setting an arbitrary divided area as an area of interest, and setting the area of interest as a learning area if at least one of divided areas adjacent to the area of interest is a learning area, and the step of contracting the learning area group comprises setting an arbitrary learning area as an area of interest, and removing the area of interest from the learning area group if at least one of divided areas adjacent to the area of interest is a non-learning area.

As described in claim 5, when the class includes a plurality of classes, a division number for each class is obtained on the basis of the statistical significance level, a division number common to all the classes is determined from the division numbers obtained for the respective classes, and the step of associating data with each divided area, the step of expanding the learning area group, and the step of contracting the learning area group are performed for each class. With this operation, even if a plurality of classes are present, a classification model that approximates the space of each class can be easily generated.

As described in claim 6, when e learning areas, of a total number N of learning areas recognized as areas belonging to a given class, are recognized as areas belonging to another class as well, e/N is set as an identification error ratio indicating separability of classes from each other.

As described in claim 7, according to the present invention, there is provided a recording medium on which a program is recorded, the program making a computer to execute the step of, when n-dimensional data which belongs to one class in an n-dimensional feature space defined by n types of variates and whose position is specified by the variates is input, dividing the feature space into m divided areas by performing m-part division for each of the variates, and determining a division number m on the basis of a statistical significance level in the division by regarding a degree of generation of a divided area containing one data as a degree following a probability distribution with respect to the division number m, the step of setting a divided area containing n-dimensional data as a learning area belonging to the class, and associating each input data with a corresponding divided area, the step of adding divided areas around the learning area as learning areas to expand a learning area group. and the step of removing a learning area located on a boundary between the learning area and a divided area which is not a learning area from the learning area group to contract the learning area group.

[Effect]

(1) According to the present invention, as described in claim 1, the division number m is determined on the basis of a statistical significance level to divide the feature space, and each of the input n-dimensional data is associated with a corresponding divided area. With this operation, even if the spaces of the respective classes cannot be linearly separated, a classification model that can nonlinearly separate the spaces of the respective classes can be generated. As a result, since the space of each class can be accurately approximated, classification processing with a low classification error ratio can be performed. Since divided areas each having a statistically significant size are generated by determining the division number m on the basis of a statistical significance level, the influence of an unbalanced distribution of data can be reduced. In addition, since divided areas are not generated more than necessary, the memory capacity used in the computer can be reduced as compared with the conventional pattern recognition method, and the learning speed of generating a classification model and the classification processing speed can be increased. Furthermore, when the user of the system refers to the learning state of data around data corresponding to the situation to be classified, and determines that the data for the generation of a classification model is insufficient, the user can withhold classification processing. This therefore decreases the possibility of classifying the situation as a situation belonging to a wrong class.

(2) As described in claim 3, an area containing data regarded as noise can be removed from learning areas by removing a learning area having no learning area among adjacent areas from a learning area group. The influence of noise can therefore be reduced.

(3) As described in claim 5, after a division number is obtained for each class on the basis of a statistical significance level, a division number common to all the classes is determined, and the step of associating data with each divided area, the step of expanding a learning area group, and the step of contracting the learning area group are performed for each class. With this operation, even if a plurality of classes are present, a classification model that approximates the space of each class can be easily generated.

(4) As described in claim 6, when e learning areas, of a total number N of learning areas recognized as areas belonging to a given class, are recognized as areas belonging to another class as well, e/N is set as an identification error ratio. With this operation, whether the variates defining the feature space are properly selected can be checked by using this identification error ratio. In addition, since the identification error ratio associated with the generated classification model can be obtained, the classification performance of the classification model can be known in advance.

(5) As described in claim 7, by recording the program on the recording medium, the computer can be made to execute the step of determining the division number m, the step of associating data with each divided area, the step of expanding the learning area group, and the step of contracting the learning area group.

5. BEST MODE OF CARRYING OUT THE INVENTION

[First Embodiment]

Figure 1:
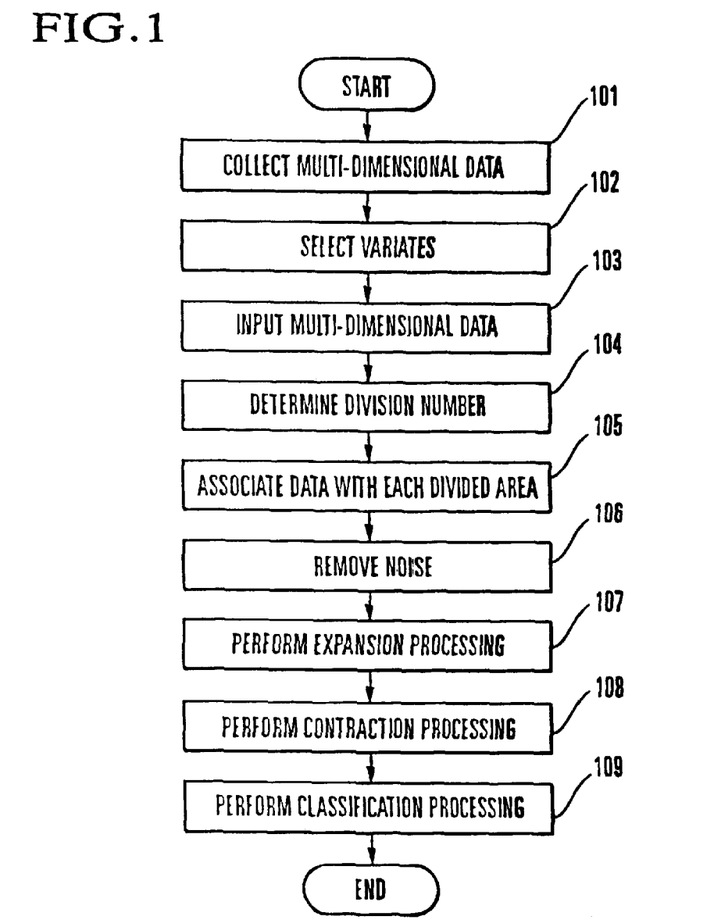
FIG. 1 is a flow chart for explaining a classification model generating method according to the first embodiment of the present invention.

Embodiments of the present invention will be described in detail next with reference to the accompanying drawings. FIG. 1 is a flow chart for explaining a classification model generating method according to the first embodiment of the present invention.

As a computer system using the classification model generating method of the present invention, a system having a known arrangement including a computer, a display unit, a keyboard, an external storage unit, and the like may be used. The computer main body may have a known arrangement including a CPU, a ROM, a RAM, circuits for interfacing with the display unit, the keyboard, and the external storage unit, and the like. The CPU executes processing in accordance with a program stored in the ROM or the RAM or a command input through the keyboard. In addition, the CPU can write data in the external storage unit and read out data from the external storage unit.

In this computer system, a program for implementing the classification model generating method of the present invention is provided in the form of a program recorded on a recording medium such as a flexible disk, a CD-ROM, or a memory card. When this recording medium is inserted into the external storage unit, the program recorded on the medium is read out and transferred to the computer. The CPU then writes the read program in the RAM or the like. In this manner, the CPU executes the following processing.

The basic concept of the classification model generating method of the present invention will be described next.

If there are n types of variates selected for situation classification, the corresponding feature space is the n-dimensional space defined by the n types of variates. According to the present invention, n types of variates regarded as suitable for situation classification or good in separability of classes from each other are selected, and the range of the minimum value to the maximum value of each variate is normalized. Each variate is then divided by a certain number m to divide the feature space into a finite number of areas. The separability of classes from each other will be described later.

When there is one class to which a total number M of data belong, variates suitable for characterizing this class are selected to define a feature space containing the class area.

With this operation, the data belonging to the above class are distributed in the feature space as points whose positions are specified by the variates. When each variate is divided by m, the feature space is divided into $m^n$ areas. The respective generated areas are classified depending on whether they contain data or not. This is the basic method of generating a classification model.

Figure 2:
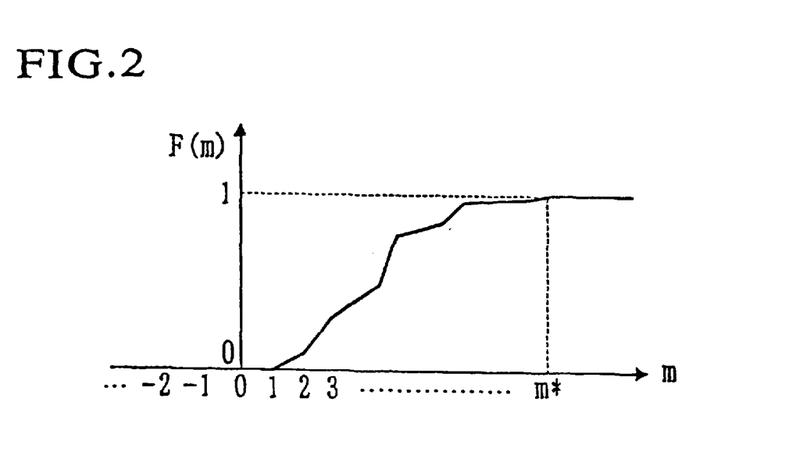
FIG. 2 is a graph showing the characteristics of a ratio F(m) with respect to a division number m.

A method of deciding a division number m with which an appropriate classification model can be generated will be described next. Consider a ratio F(m)=p/M where p is the number of divided areas, of the divided areas generated by m-part division, each of which contains one data. This ratio F(m) can be regarded as the likelihood of a divided area containing one data, and exhibits the characteristics shown in FIG. 2 with respect to the division number m. That is, the ratio F(m) is a non-decreasing function and has the following characteristics:

$$\lim_{m \to -\infty} F(m) = \lim_{m \to 1} F(m) = 0, \lim_{m \to +\infty} F(m) = \lim_{m \to m^*} F(m) = 1 \quad (2)$$

Referring to FIG. 2 and expression (2), m* is the first division number m when F(m)=1 as the division number m increases. The division number m is an integer and can only take a discrete value. However, F(m) can be regarded as continuous, considering the intermediate value between the length obtained by 2-part division (full range of variate/2) and the length obtained by 3-part division (full range of variate/3) as rational division such as 2.5-part division.

The ratio F(m) is therefore a right continuous function and can be regarded as one of probability distribution functions. Let us consider that the continuous function F(m) is sampled with the integer m.

Consider a data density of 1. In this case, the data density of 1 is the distance from given data of interest to the nearest data. This distance is an Euclidean distance. Letting x1, x2, . . . , xn be the values of variates representing first data, and x1', x2', . . . , xn' be the values of variates representing the second data, the Euclidean distance between the first data and the second data is given as $((x1-x1')^2+(x2-x2')^2+ \ldots +(xn-xn')^2)^{1/2}$.

The frequency distribution of this data density of 1 can be regarded as a normal distribution. It is when the frequency of the data density of 1 is highest that the degree of generation of a divided area containing one data becomes highest as the division number m increases. The above degree decreases when the data density of 1 is very low or very high.

That is, the degree of generation of a divided area containing one data follows a normal distribution with respect to the division number m.

It is obvious that the data density of 1 follows a normal distribution, when a distance in associated with data density is considered as a distance corresponding to the length and width of each divided area obtained by m-part division instead of a Euclidean distance. For example, this distance is given as max(|x1-x1'|, |x2-x2'|, . . . , |xn-xn'|) where max indicates that the maximum value of the values in ( ) is extracted.

It is conceivable from the above description that a significant division number m can be determined on the basis of a normal distribution. To obtain an average $\mu$ and a variance $\sigma$ for the division number m with which at least one divided area containing one data is generated, the total number M of data belonging to a class must be 200 or more. This is because when M≧200, the average $\mu$ and the variance $\sigma$ can be regarded as true values.

With respect to the division number m with which at least one divided area containing one data is generated, the average $\mu$ and the variance $\sigma$ can be calculated by $$\mu = \sum_{m=-\infty}^{+\infty} m(F(m) - F(m-1)) = \sum_{m=2}^{m^*} m(F(m) - F(m-1)) \quad (3)$$

$$\sigma = E(m^2) - (E(m))^2 \quad (4)$$

$$= \sum_{m=-\infty}^{+\infty} m^2(F(m) - F(m-1)) - \left(\sum_{m=-\infty}^{+\infty} m(F(m) - F(m-1))\right)^2$$

$$= \sum_{m=2}^{m^*} m^2(F(m) - F(m-1)) - \left(\sum_{m=2}^{m^*} m(F(m) - F(m-1))\right)^2$$

The word "significant" of "the significant division number m" is often used in the field of statistics. That is, the division number m determined upon determination of a given statistical significance level satisfies the conditions that the degree of generation of a divided area containing one data is high, and the distance between divided areas is minimized. This division number m therefore becomes a value that implements an appropriate classification model. Note that F(m)–F(m–1) obtained by subtracting the ratio F(m–1) with a division number m–1 from the ratio F(m) with the division number m corresponds to the degree of generation of a divided area containing one data in the case of m-part division.

In this embodiment, $\mu+3\sigma$ is set as a statistical significance level, and the integer nearest to this level is set as the significant division number m. Obviously, the statistical significance level is not limited to $\mu+3\sigma$.

The division number m can be determined in this manner. The above description is associated with the case of one class. If i classes (i=1, . . . , k; k≧2) are present, a division number mi is obtained for each class by the above method, and the final division number m common to all the classes is obtained on the basis of the division numbers mi.

$$m = \max_{i=1}^{k} (mi_{(\mu i+3\sigma i)}) \quad (5)$$

where $\mu i$ is the average in the class i obtained by equation (3), $\sigma i$ is the variance in the class i obtained by equation (4), and $Mi_{(\mu i+3\sigma i)}$ is the division number in the class i obtained from $\mu i+3\sigma i$. In addition, "max" indicates that the maximum value of $mi_{(\mu i+3\sigma i)}$ is extracted. Note that the processing to be described later may be performed for each class with the division number mi for each class without obtaining the division number m common to all the classes.

Actual processing based on the above basic concept will be described next. First of all, the user of the computer system collects multi-dimensional data characterized by a plurality of types of variates (step 101 in FIG. 1). Then, n types of variates regarded as suitable for situation classification or good in separability of classes from each other are selected from the plurality of types of variates (step 102). The user inputs the collected data as multi-dimensional data characterized by the n types of variates (i.e., data whose positions in the feature space are specified by the n types of variates) to the computer (step 103).

Figure 3:
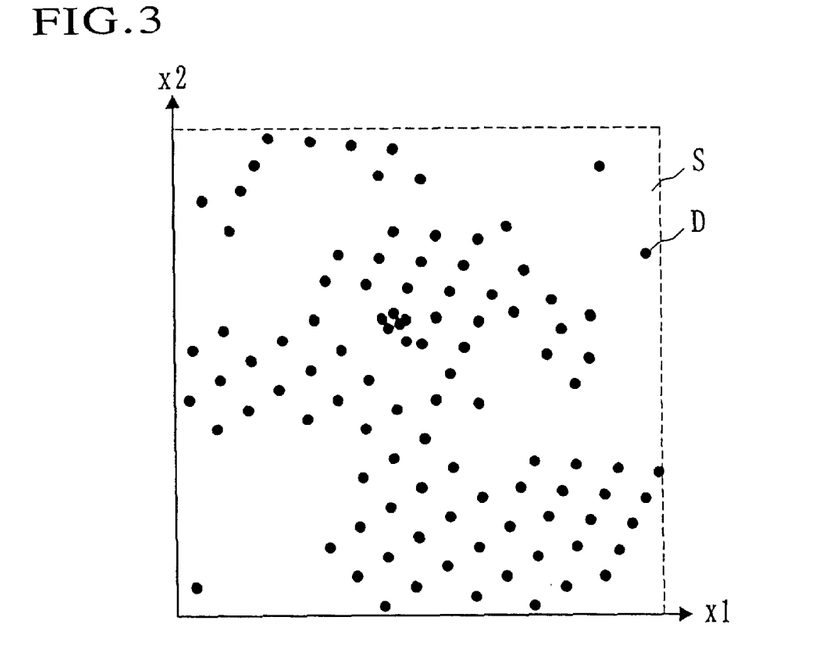
FIG. 3 is a view showing an example of how data are distributed in a two-dimensional feature space in the first embodiment of the present invention.

Assume that there is one class A characterized by two variates x1 and x2, and a plurality of data D belonging to class A are distributed in a two-dimensional feature space 3 defined by the variates x1 and x2, as shown in FIG. 3.

Figure 4:
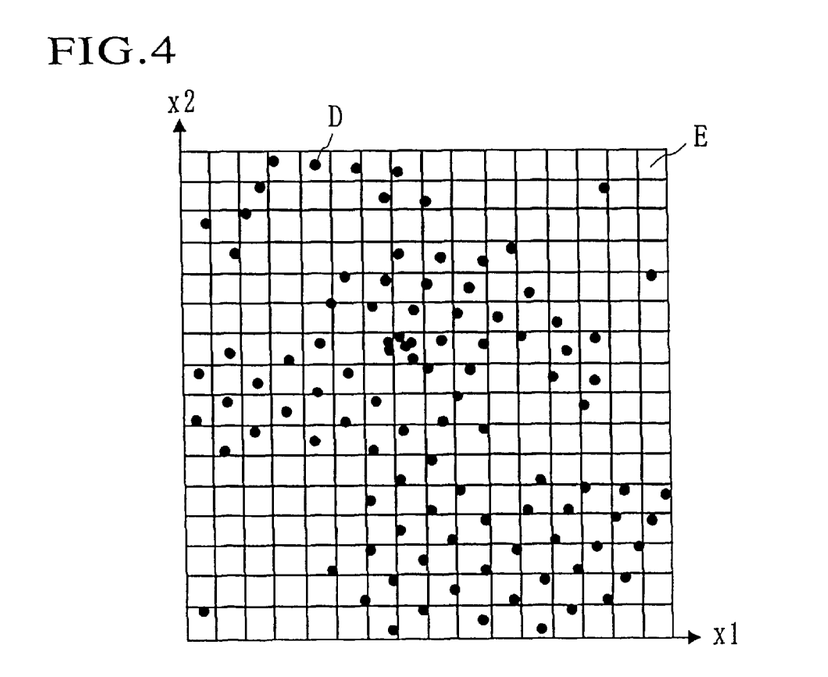
FIG. 4 is a view showing the result obtained by dividing each of two variates by 16 in the feature space in FIG. 3.

Upon reception of the many data D characterized by the variates x1 and x2, the computer determines the division number m by the above method (step 104). In this case, division number m=16. FIG. 4 shows the result obtained by dividing each of the full ranges of the variates x1 and x2 by 16. With this operation, the feature space S is divided into 256 areas E.

Figure 5:
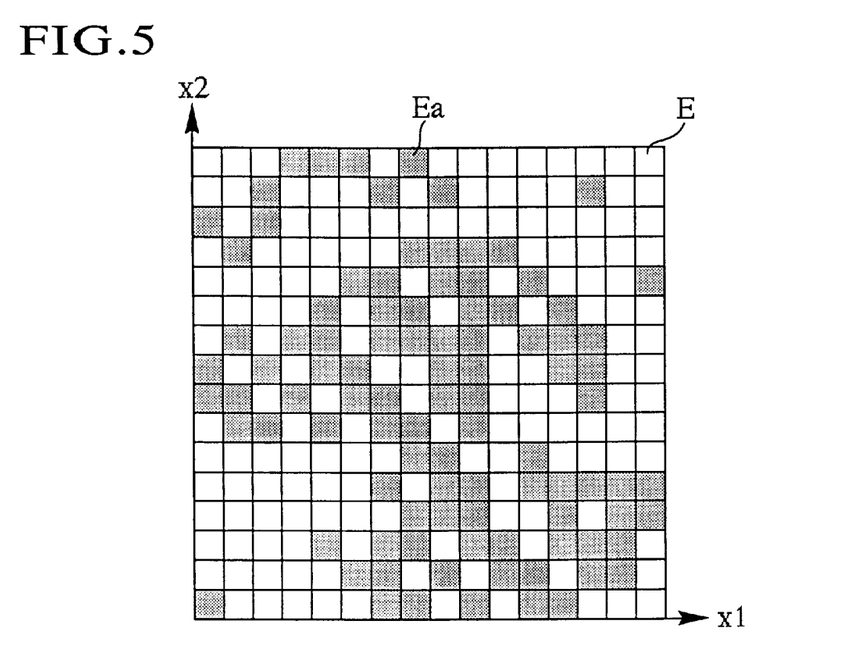
FIG. 5 is a view showing learning areas, of the areas generated by division, which are determined as areas belonging to a class.

The computer associates the divided areas E generated by m-part division with the data D to perform classification in the feature space S (step 105). More specifically, if the data D is present in a given divided area E, the computer recognizes this area E as an area belonging to class A. Each divided area E determined as an area belonging to class A will be referred to as a learning area Ea hereinafter. FIG. 5 shows these learning areas Ea.

Note that the learning areas Ea include divided areas each containing two or more data. To accurately express such data, division must be performed more finely. From a statistical viewpoint of all the data, the division shown in FIG. 4 is appropriate.

Figure 6:
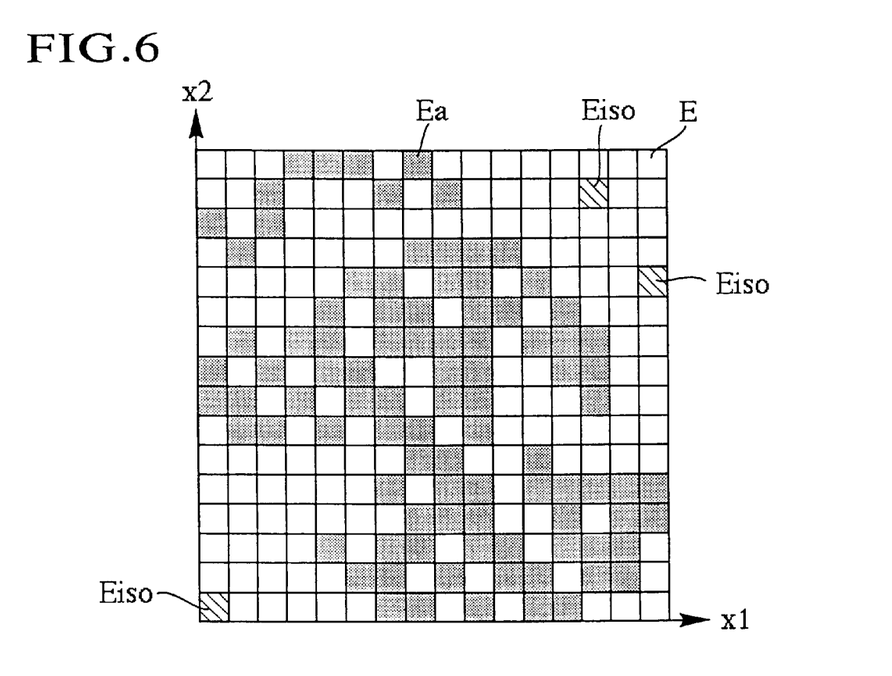
FIG. 6 is a view showing isolated areas of the learning areas determined as areas belonging to the class.

The computer removes divided areas containing data regarded as noise from the learning areas Ea (step 106). This step is required because data as noise are included in the data in FIG. 3 in practice. In this embodiment, any divided area having no learning area Ea among adjacent divided areas is determined as an area containing data regarded as noise. This area will be referred to as an isolated area Eiso. These isolated areas Eiso are removed from the learning areas Ea. FIG. 6 shows the isolated areas Eiso.

Figure 7:
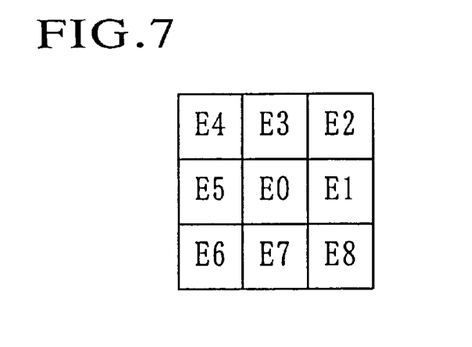
FIG. 7 is a view showing a definition of adjacent areas.

When a feature space is n-dimensional, $3^n-1$ areas near a given area E0 will be referred to as areas adjacent to the area E0. If, for example, a feature space is two-dimensional, areas E1 to E8 will be referred to as areas adjacent to the area E0, as shown in FIG. 7.

The processing in steps 104 to 106 is performed on the basis of the data shown in FIG. 3. The data in FIG. 3 may be insufficient as data representing entire class A. Divided areas that are to belong to class A may be present in addition to the learning areas Ea determined as areas belonging to class A in step 105. When the feature space in FIG. 6 is regarded as an image, and expansion/contraction processing, which is used in an image processing technique, is executed for this image, the areas that are to belong to class A are included in the learning areas Ea.

Figure 8:
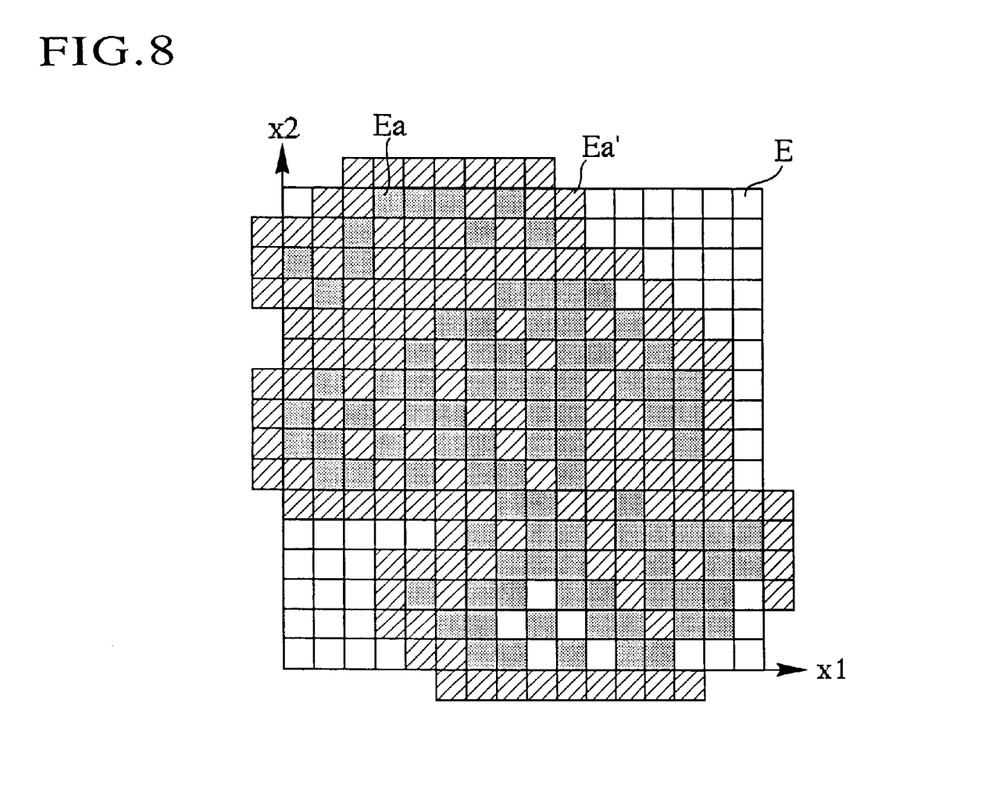
FIG. 8 is a view showing the result obtained by performing expansion processing for the feature space in FIG. 6.

First of all, the computer performs expansion processing for the feature space in FIG. 6 (step 107). In the expansion processing, if at least one of the divided areas adjacent to an arbitrary divided area as an area of interest is the learning area Ea, it is determined that the area of interest may belong to class A, and the area of interest is set as a learning area. This processing is performed for all the areas in the feature space. FIG. 8 shows the result of the expansion processing. Referring to FIG. 8, areas Ea' are areas that are newly added as learning areas.

Figure 9:
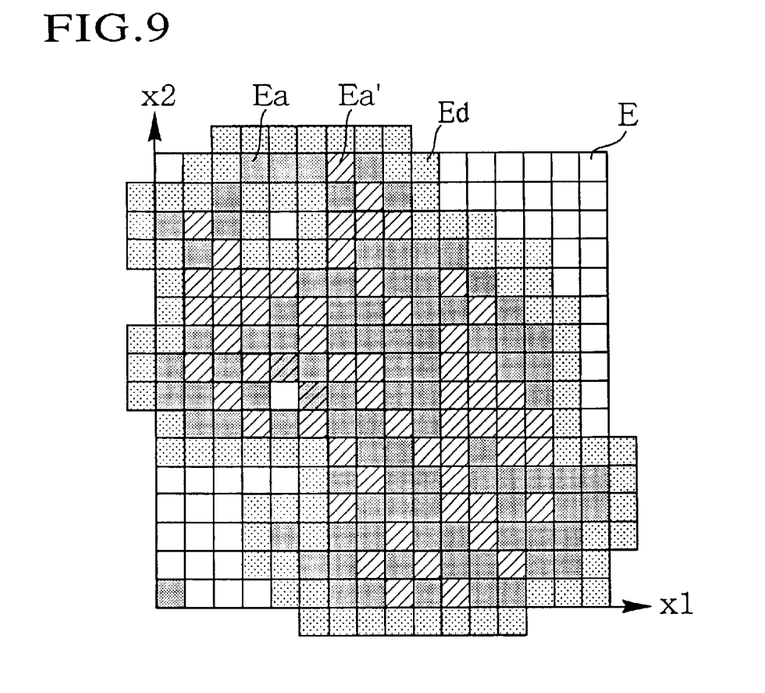
FIG. 9 is a view showing the result obtained by performing contraction processing for the feature space in FIG. 8.

Subsequently, the computer performs contraction processing for the feature space in FIG. 8 (step 108). In the contraction processing, if at least one of the divided areas adjacent to arbitrary learning areas Ea and Ea' as areas of interest is a non-learning area E, the areas of interest are regarded as areas that are not to belong to class A, and the areas of interest are removed from the learning areas Ea and Ea'. This processing is performed for all the learning areas Ea and Ea'. FIG. 9 shows the result of the contraction processing. Referring to FIG. 9, areas Ed are areas that are removed from the learning areas Ea and Ea'. Note that expansion/contraction processing poses no problem in the state-of-the-art computers, and can be complete within several seconds.

Figure 10:
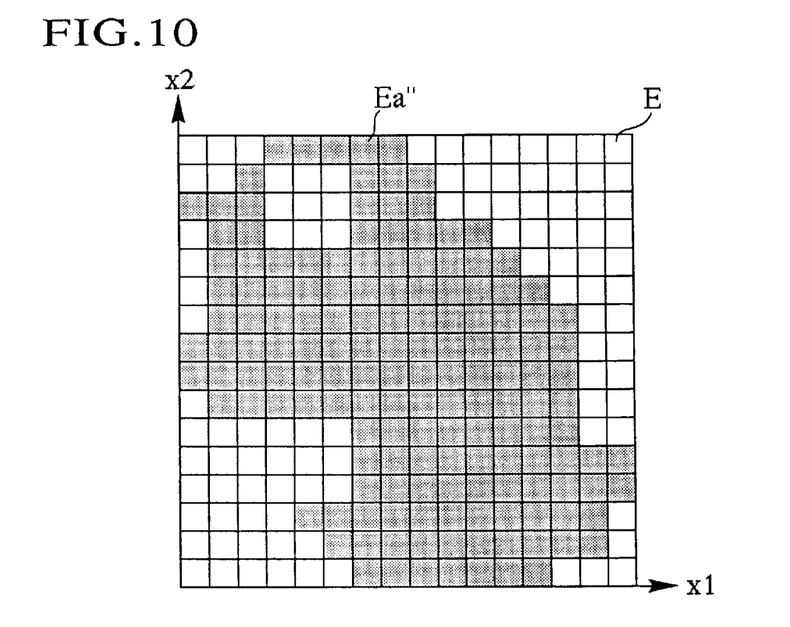
FIG. 10 is a view showing a final classification model after contraction processing in the first embodiment of the present invention.

The areas obtained by combining the learning areas Ea and Ea' after the above processing are final learning areas Ea" shown in FIG. 10. A classification model is obtained by classifying the feature space into the learning areas Ea" belonging to class A and the non-learning areas E in this manner.

The user inputs the variates x1 and x2 representing the situation to be classified. In accordance with this operation, the computer performs classification processing by using the generated classification model (step 109). More specifically, the computer classifies the situation depending on whether the data whose position on the classification mode is designated by the input variates x1 and x2 belongs to the learning area Ea" or the area E. If the data corresponding to the situation to be classified is located in the learning area Ea", the situation is recognized as a situation belonging to class A. If the data is located in the area E, the situation is recognized as a situation that does not belong to class A. In the case in which the situation is recognized as a situation belonging to class A, if all the areas surrounding one learning area Ea" containing the data designated by the input variates x1 and x2 are the learning areas Ea", it can be determined that the likelihood of the classification result that the situation is determined to belong to class A is high. In contrast to this, even in the case in which the situation is recognized as a situation belonging to class A, if the areas surrounding one learning area Ea" containing the data designated by the input variates x1 and x2 include both the learning and non-learning areas Ea and E, it can be determined that the likelihood of the classification result that the situation is determined to belong to class A is low.

Figure 11:
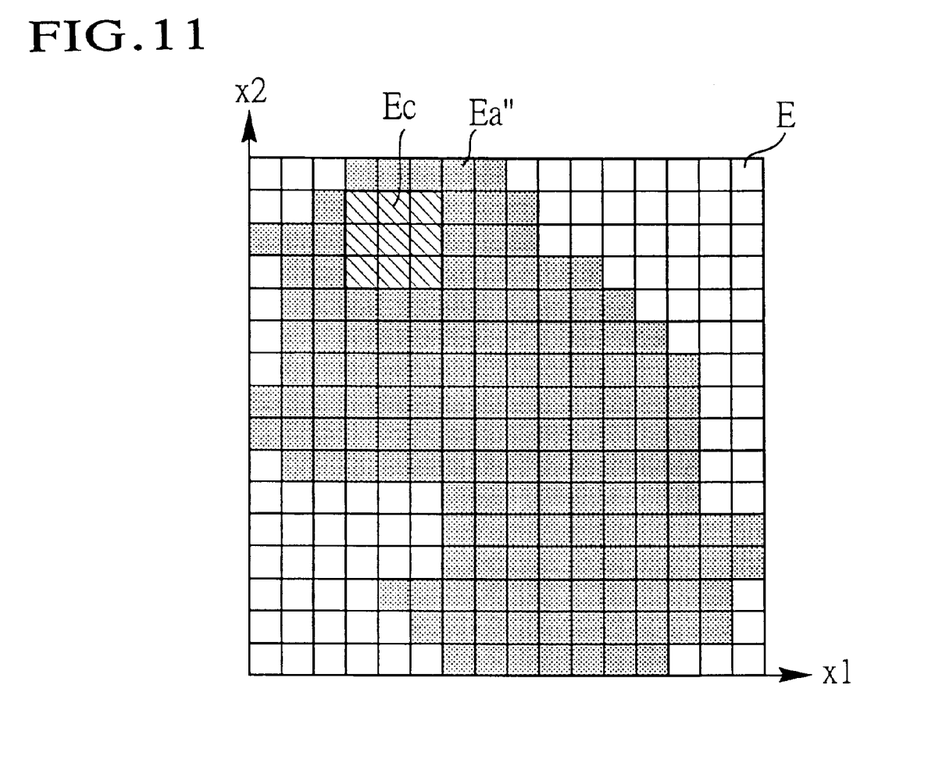
FIG. 11 is a view showing areas, in the classification model in FIG. 10, which are regarded as areas corresponding to insufficient data for the generation of the classification model.

In addition, according to the present invention, since a classification model is generated by using only collected data, the collected data may be insufficient for the generation of learning areas. Assume that the user can refer to the generated classification model to check whether the data used to generate the classification model is sufficient, and determines that the data is insufficient. In this case, the user can withhold classification processing using this classification model. For example, in the case of the classification model in this embodiment, consider an area Ec of the hatched portion in FIG. 11. Most of the divided areas around this area Ec are learning areas Ea". It is therefore obvious from the area Ec that the data used to generate the classification mode may be insufficient.

This embodiment has exemplified the case of one class. If, however, a plurality of classes are present, the processing in steps 103 to 108 may be performed for each class in a common feature space to generate a classification model. In this case, as the division number m, a division number common to all the classes, which is obtained by equation (5), may be used, or different division numbers may be used for the respective classes.

Assume that there are a plurality of classes. In this case, if e learning areas, of a total number N of learning areas recognized as areas belonging to a given class, are recognized as areas belonging to another class as well, an identification error ratio R can be defined by $$R = e/N \qquad (6)$$

Since this identification error ratio R can be regarded as an index representing separability of classes from each other, whether variates for defining a feature space are properly selected can be checked by using the identification error ratio R. In addition, since the identification error ratio associated with a generated classification model can be obtained, the classification performance of the classification model can be known in advance.

As described above, according to the present invention, divided areas corresponding to pixels in an image processing technique are generated in a feature space on the basis of a data density, and a classification model is generated by classifying the generated divided areas depending on whether they contain data. Situation classification for abnormal determination, operation decision, and the like is performed by using this classification model.

In an image processing technique or a conventional pattern recognition method, since the number of pixels is determined in advance, a large number of pixels more than necessary may be used to approximate a class area. For this reason, in the conventional pattern recognition method, a large memory is required, and the classification processing speed is low. In contrast to this, in the present invention, since divided areas are generated from an element having a statistically significant size on the basis of a data density, divided areas are not generated more than necessary. The performance of the computer can therefore be improved more than in the conventional method.

In the conventional method, when data is insufficient for generation of a classification model or the space occupied by a class has a complicated shape, there is a high possibility of a classification error. In contrast to this, according to the present invention, even if data representing the situation to be classified included in a non-learning area, the user of the computer system can mediate classification processing by referring to which clasp the surrounding areas belong. This minimizes the possibility of erroneous classification of a situation.

[Second Embodiment]

The present invention will be described in more detail next by presenting a more specific example. A PID controller is generally used in an air conditioner. However, since parameters are not properly set in the PID controller in accordance with all situations, a phenomenon called hunching occurs. Hunching is a phenomenon in which a controlled variable oscillates with respect to a target set value. In an air conditioner in a building, it is difficult to properly cope with every situation by suing one type parameter.

If a classification model is generated by the classification model generating method of the present invention, and situations in which hunting occurs are classified, the parameters in the PID controller can be properly switched in accordance with each situation. The air conditioner can therefore be properly controlled in any situation.

Figure 12:
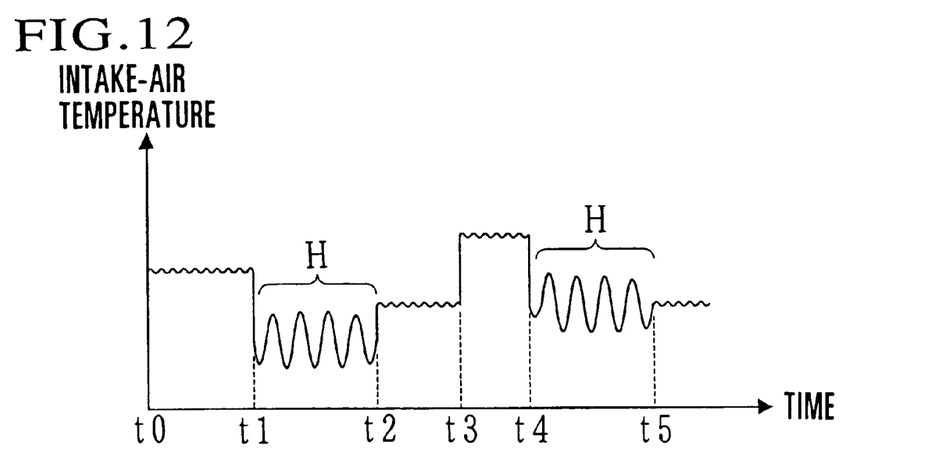
FIG. 12 is a graph showing how hunting occurs at intake-air temperatures in a VAV system as one of air-conditioning systems according to the second embodiment of the present invention.

In this embodiment, intake-air temperature control in a VAV (Variable Air Volume) system as one of air-conditioning systems will be described. As shown in FIG. 12, when hunting H occurs in the intervals between time t1 and time t2 and between time t4 and time t5, the user distributes data in the intervals between time t0 and time t1 and between time t2 and time t4 and data after time t5, in which no hunting H occurs, to class A in advance, and data in the intervals between time t1 and time t2 and between time t4 and time t5, in which the hunting H occurs, to class B. In this case, variates of data to be collected include all variates associated with the VAV system, in addition to intake-air temperature data.

Subsequently, the user selects variates suitable for classification of situations in which hunting occurs. Since ventilation temperatures and ventilation humidities are known as factors that cause intake-air temperature hunting, the user selects these two factors as variates. The user then inputs the collected data as multi-dimensional data characterized by ventilation temperatures and ventilation humidities to the computer.

Figure 13:
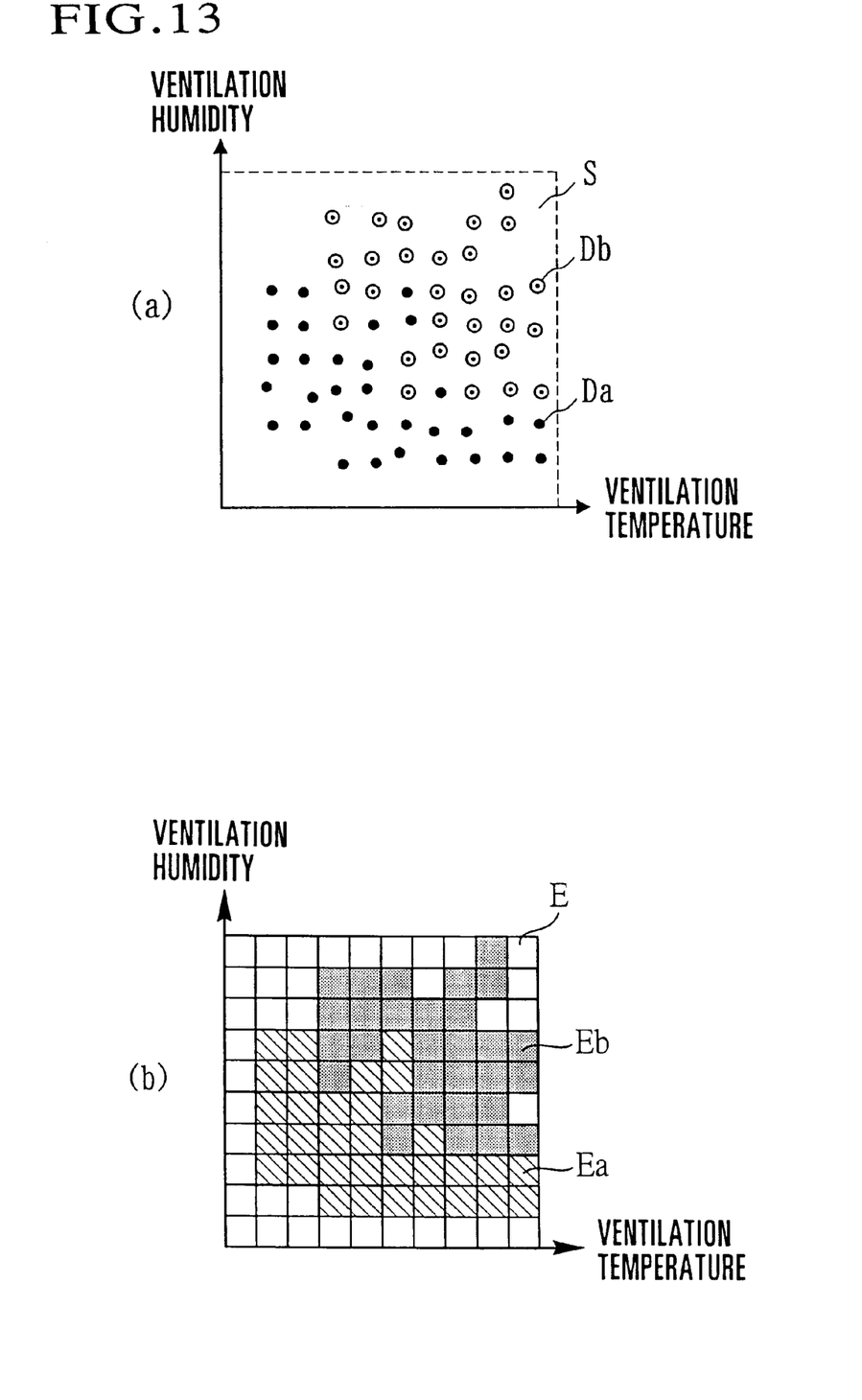
FIG. 13 is a view showing an example of how data are distributed in a two-dimensional feature space and a classification model generated on these data, according to the second embodiment of the present invention.

Assume that a plurality of data Da belonging to class A and a plurality of data Db belonging to class B are distributed in a feature space S defined by the two variates, i.e., ventilation temperature and ventilation humidity, as shown in FIG. 13(a). Upon reception of these data, the computer classifies the feature space S into three areas, namely a learning area Ea belonging class A, a learning area Eb belonging to class B, and a non-learning area E, thereby generating a classification model like the one shown in FIG. 13(b).

By using the generated classification model in this manner, the current situation specified by a ventilation temperature and a ventilation humidity can be classified as a situation in which hunting occurs or not. The parameters in the PID controller can therefore be switched in accordance with the classification result. Consequently, intake-air temperature control in the VAV system can be performed without causing hunting in any situation.

[Third Embodiment]

In a petrochemical process, the quality of each product is monitored. However, a deterioration in quality often occurs in unexpected situations. If an appropriate classification model is generated by the classification model generating method of the present invention, and situations in which a deterioration in quality occurs are classified, a process can be driven or control parameters can be switched so as to avoid situations in which a deterioration in quality occurs.

Figure 14:
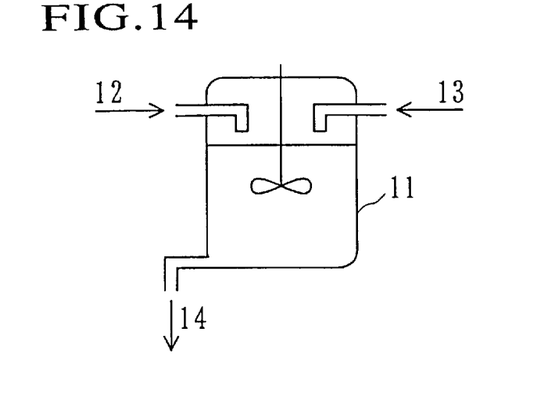
FIG. 14 is a view showing the arrangement of a reactant producing plant according to the third embodiment of the present invention.
Figure 15:
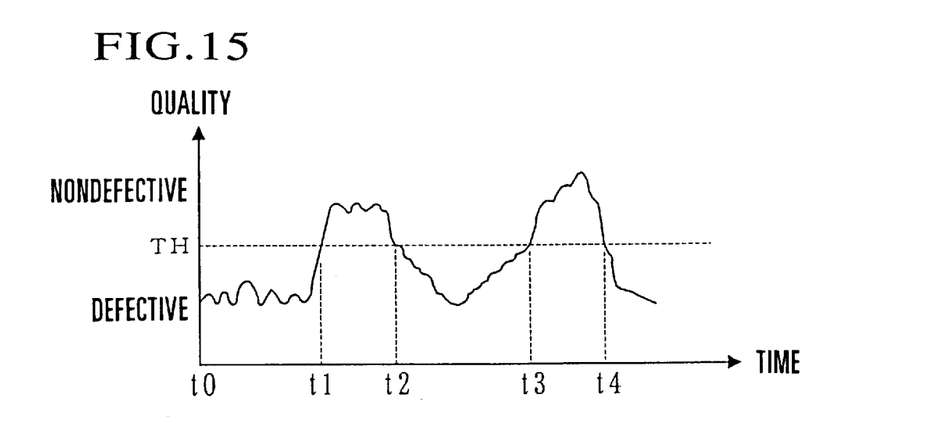
FIG. 15 is a graph showing the quality of reactants produced by the plant in FIG. 14.

This embodiment will exemplify the chemical process in which materials 12 and 13 are charged into a reactor 11 containing a solvent and a catalyst to produce reactants 14, as shown in FIG. 14. FIG. 15 shows the quality (composition) of the reactants 14 produced by the plant shown in FIG. 14. Referring to FIG. 15, reference symbol TH denotes a threshold for classifying reactants into non-defective products and defective products. When the quality is less than the threshold TH, the reactant 14 is classified as a nondefective product. When the quality exceeds the threshold TH, the reactant 14 is classified as a defective product.

If the reactants 14 are produced as defective products in the intervals between time t1 and time t2 and between time t3 and time t4, as shown in FIG. 15, the user distributes data in the intervals between time t0 and time t1 and between time t2 and time t3 and data after time t4, in which no defective product is produced, to class A in advance, and data in the intervals between time t1 and time t2 and between time t1 and time t2, in which defective products are produced, to class B. In this case, the variates of data to be collected include all variates associated with a chemical process (the charges of the materials 12 and 13, the amount of solvent, the amount of catalyst, the temperature in the reactor 11, and the composition of the reactant 14). The user then specifies factors that produce defective products among the reactants 14 by statistical analysis, the mechanism of a process, and heuristics. If, for example, the charge of the material 13 and the amount of catalyst are factors associated with the quality of the reactants 14, the user selects these two factors as variates, and inputs the collected data belonging to class B as multi-dimensional data characterized by the charge of the material 13 and the amount of catalyst to the computer.

Figure 16:
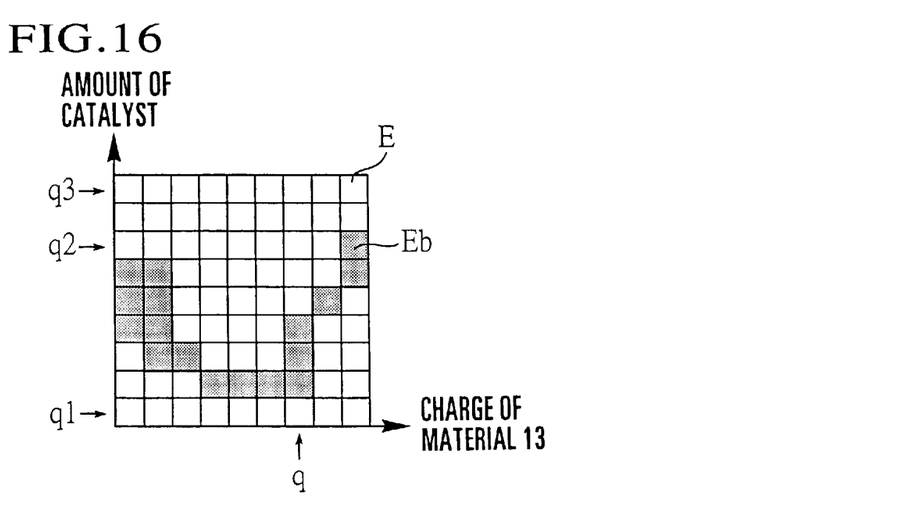
FIG. 16 is a view showing a classification model generated in the third embodiment of the present invention.

Upon reception of these data, the computer classifies the feature space into learning areas Eb belonging to class B and non-learning areas E, thereby generating a classification model like the one shown in FIG. 16.

With the use of the generated classification model, when certain amounts of the material 13 and catalyst are used, the corresponding situation can be classified as a situation in which defective products are produced among the reactants 14 or no defective product is produced. Therefore, control can be performed to prevent production of defective products. Assume that the material 13 is to be charged in an amount q. In this case, as is obvious, nondefective products can be produced by using a catalyst in an amount q1 or within a range of amounts q2 to q3.

[Fourth Embodiment]

In the manufacturing industry, detecting abnormalities in facilities is necessary to avoid serious damage due to failures and danger such as an explosion. However, an abnormality rarely occurs in the facilities, and hence it is difficult to collect data about abnormal situations. In this embodiment, therefore, only data collected during normal operation of the facilities are used unlike in the second and third embodiments.

A rotating machine will be described below. Assume that whether the rotating machine is normal/abnormal can be discriminated on the basis of the rotational speed of the machine and the frequency of the sound made by the machine. In this case, the user of a computer system selects the rotational speed and the frequency of the sound as variates, and inputs the data collected during normal operation as multi-dimensional data characterized by the rotational speed and the frequency of the sound to the computer.

Figure 17:
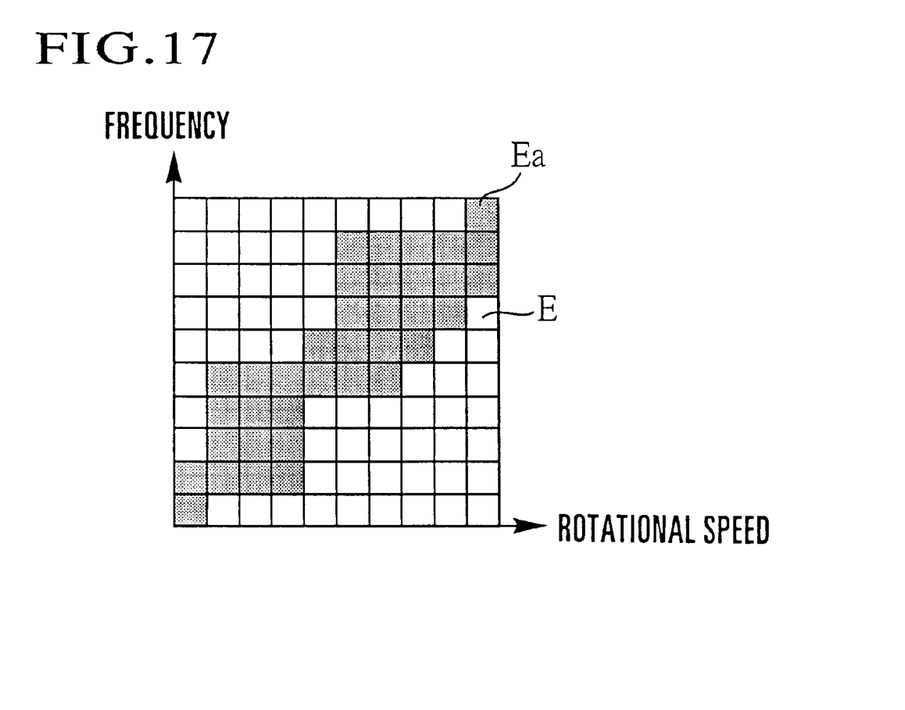
FIG. 17 is a view showing a classification model generated in the fourth embodiment of the present invention.

Upon reception of these data, the computer classifies the feature space into learning areas Ea belonging to class A (a set of normal situations) and non-learning areas E, thereby generating a classification model like the one shown in FIG. 17. On this classification model, the current situation of the rotating machine is represented by a point specified by the rotational speed and the frequency. The point corresponding to the current situation is included in a given divided area in the classification model.

Figure 18:
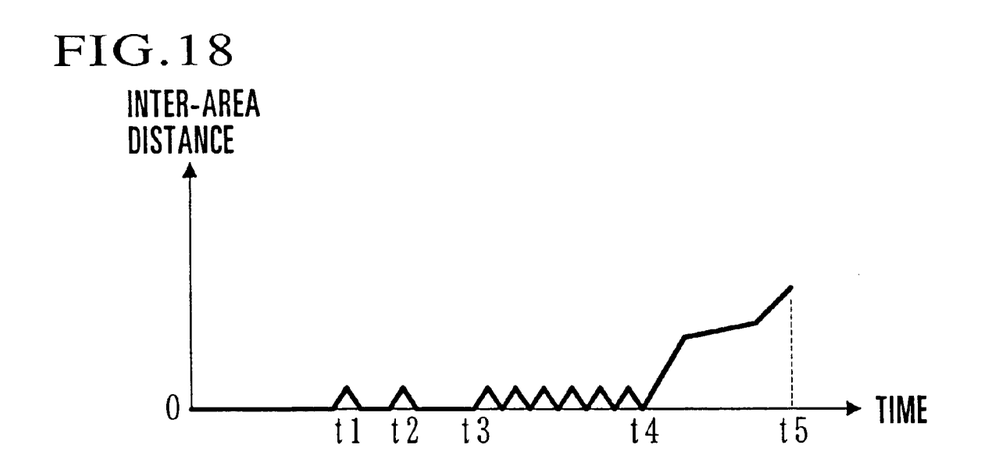
FIG. 18 is a graph showing the inter-area distance between a divided area containing the current situation and a learning area in the fourth embodiment of the present invention.

The user makes the computer calculate the distance from the divided area containing the current situation to the learning area Ea, and makes the display unit to display a change in this inter-area distance on a graph, as shown in FIG. 18. The inter-area distance in FIG. 18 indicates the relationship between the current situation and the normal situation of the rotating machine. Monitoring this graph, the user can determine whether the rotating machine is normal/abnormal. More specifically, no problem is posed when a situation in which the distance is not 0 occurs temporarily as in the case of the situations at time t1 and time t2. If, however, a situation in which the distance is not 0 occurs frequently as in the case of the situation in the interval between time t3 and time t4, this situation can be regarded as the symptom of an abnormality. In addition, if the current situation gradually separates from the normal situation as in the case of the situation in the interval between time t4 and time t5, the user can know that he/she must make a quick check.

[Fifth Embodiment]

In many current manufacturing processes, skilled operators operate the systems. However, the number of skilled operators is gradually decreasing. In addition, it is difficult to transfer skilled operator's knowledge or realize automatization based on the knowledge.

Figure 19:
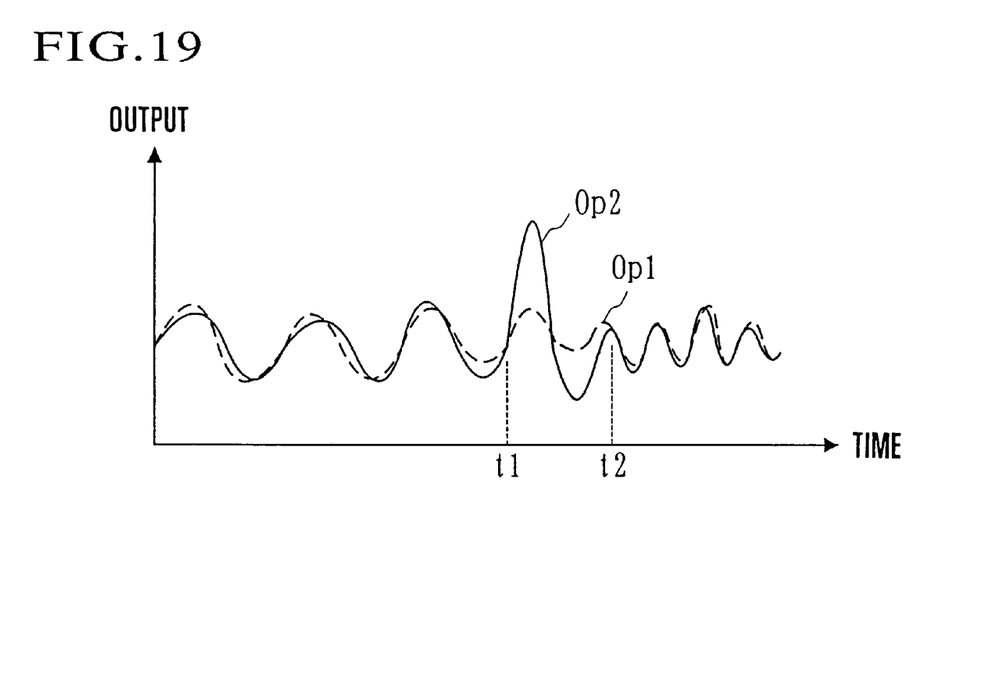
FIG. 19 is a graph showing the operation outputs based on an operation model obtained by modeling general operators and the operation outputs based on skilled operators in the fifth embodiment of the present invention.

If a classification model is generated by the classification model generating method of the present invention, specific situations in which the operation output made by a general operator greatly differs from that made by a skilled operator can be recognized. This can support or automatize operation. Since an operation model can be easily generated by modeling general operators, an operation output (an input value to the system) based on this operation model is compared with an operation output Op2 based on the skilled operator, as shown in FIG. 19.

Assume that the operation model determines an operation output on the basis of measurement values PV1 and PV2 indicating the state of the system. In this case, the user of the computer system selects the measurement values PV1 and PV2 as variates, and inputs, to the computer, the measurement values PV1 and PV2 in the interval between time t1 and time t2 in which the operation output based on the operation model greatly differs from that based on the skilled operator.

Figure 20:
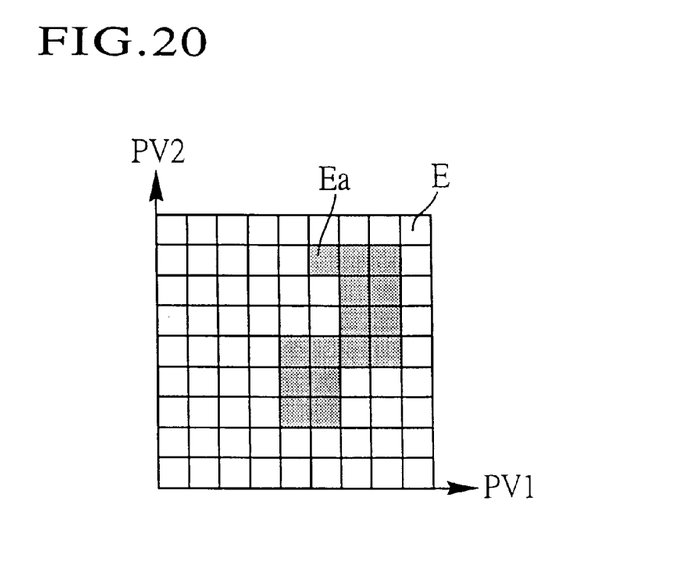
FIG. 20 is a view showing a classification model generated in the fifth embodiment of the present invention.

Upon reception of these data, the computer classifies the feature space into learning areas Ea (a set of situations in which the operation outputs based on the operation model greatly differ from those based on the skilled operator) belonging to class A and non-learning areas E, thereby generating a classification model like the one shown in FIG. 20.

By using the classification model generated in this manner, the current situation specified by the measurement values PV1 and PV2 can be classified as a situation belonging to class A or not. If the current situation belongs to class A, the operation can be supported by referring to the operation output values based on the skilled operator. Alternatively, the operation output values based on the skilled operator can be directly supplied to the system to realize automatization.

In the first to fifth embodiments, the classification model generating method of the present invention is used for situation classification to abnormality determination (detection of an undesired situation such as hunting or an abnormal state in a plant or facilities) or decision of operation to be performed in accordance with a situation. Obviously, however, this method can be used for pattern recognition for, e.g., speech or image patterns.

What is claimed is:

1. A classification model generating method characterized by comprising the steps of:

when n-dimensional data which belongs to one class in an n-dimensional feature space defined by n types of variates and whose position is specified by the variates is input, dividing the feature space into $m^n$ divided areas by performing m-part division for each of the variates, and determining a division number m on the basis of a statistical significance level in the division by regarding a degree of generation of a divided area containing one data as a degree following a probability distribution with respect to the division number m;

setting a divided area containing n-dimensional data as a learning area belonging to the class, and associating each input data with a corresponding divided area;

adding divided areas around the learning area as learning areas to expand a learning area group; and removing a learning area located on a boundary between the learning area and a divided area which is not a learning area from the learning area group to contract the learning area group.

2. A classification model generating method according to claim 1, characterized by further comprising determining the division number m based on the statistical significance level from an average and a variance for the division number m with which at least one divided area containing one data is generated.

3. A classification model generating method according to claim 1, characterized by further comprising removing a learning area having no learning area among adjacent areas from the learning area group before the learning area group is expanded.

4. A classification model generating method according to claim 1, characterized in that the step of expanding the learning area group comprises setting an arbitrary divided area as an area of interest, and setting the area of interest as a learning area if at least one of divided areas adjacent to the area of interest is a learning area, and the step of contracting the learning area group comprises setting an arbitrary learning area as an area of interest, and removing the area of interest from the learning area group if at least one of divided areas adjacent to the area of interest is a non-learning area.

5. A classification model generating method according to claim 1, characterized by further comprising, when the class includes a plurality of classes, obtaining a division number for each class on the basis of the statistical significance level, determining a division number common to all the classes from the division numbers obtained for the respective classes, and performing the step of associating data with each divided area, the step of expanding the learning area group, and the step of contracting the learning area group for each class.

6. A classification model generating method according to claim 5, characterized by further comprising, when e learning areas, of a total number N of learning areas recognized as areas belonging to a given class, are recognized as areas belonging to another class as well, setting e/N as an identification error ratio indicating separability of classes from each other.

7. A recording medium on which a program is recorded, the program making a computer to execute:

the step of, when n-dimensional data which belongs to one class in an n-dimensional feature space defined by n types of variates and whose position is specified by the variates is input, dividing the feature space into $m^n$ divided areas by performing m-part division for each of the variates, and determining a division number m on the basis of a statistical significance level in the division by regarding a degree of generation of a divided area containing one data as a degree following a probability distribution with respect to the division number m;

the step of setting a divided area containing n-dimensional data as a learning area belonging to the class, and associating each input data with a corresponding divided area;

the step of adding divided areas around the learning area as learning areas to expand a learning area group; and the step of removing a learning area located on a boundary between the learning area and a divided area which is not a learning area from the learning area group to contract the learning area group.

* * * * *